No. 694,037. Patented Feb. 25, 1902.
C. H. STRATTON.
SHIFTING SEAT VEHICLE.
(Application filed Nov. 14, 1901.)
(No Model.) 3 Sheets—Sheet 1.
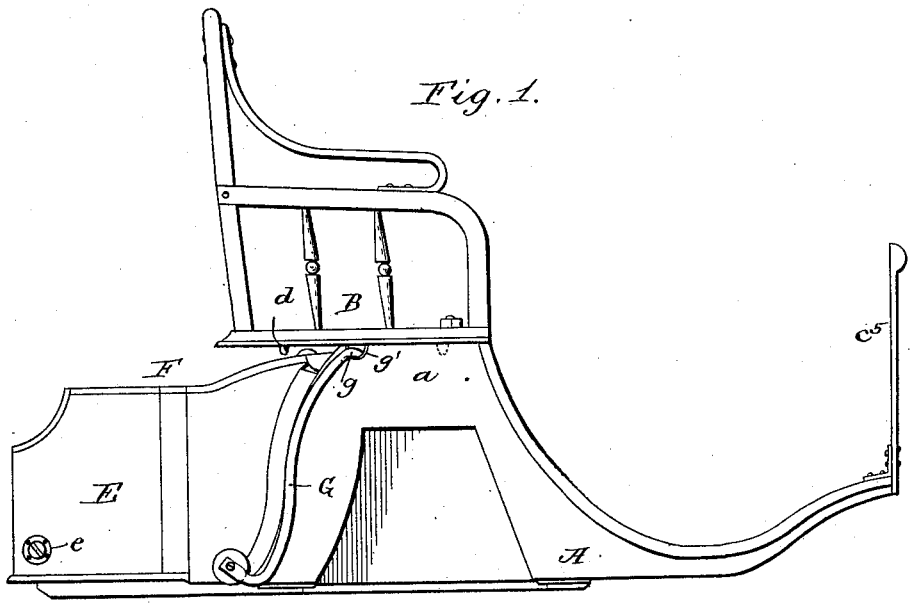
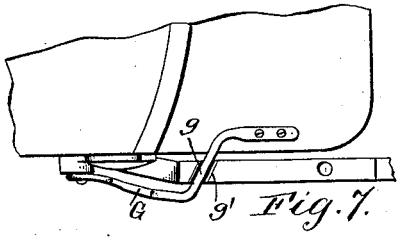
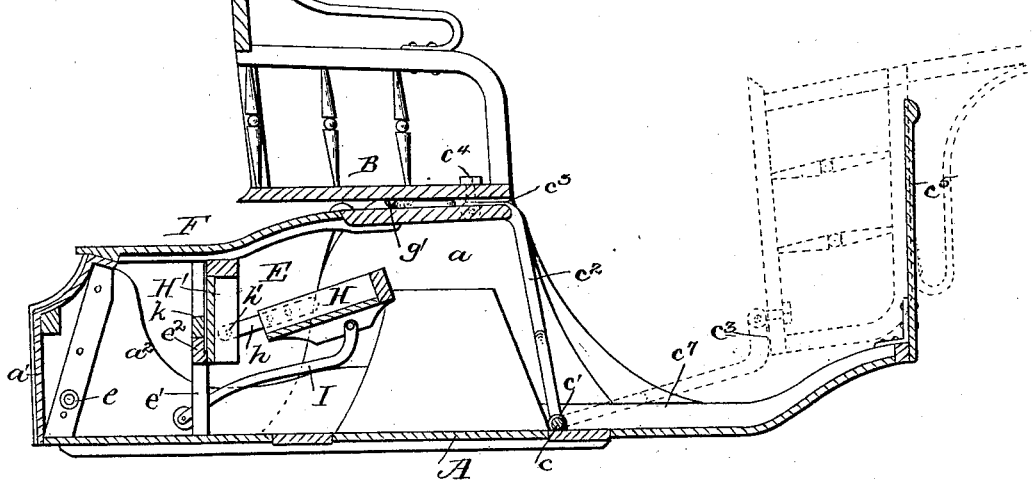
Witnesses,
F. F. Schwing
E. A. Volk
Chas H Stratton Inventor
By Wilhelm Bonner
Attorneys No. 694,037. Patented Feb. 25, 1902.
C. H. STRATTON.
SHIFTING SEAT VEHICLE.
(Application filed Nov. 14, 1901.)
(No Model.) 3 Sheets—Sheet 2.

Witnesses,
F. F. Scherjuger.
E. A. Volk.

Chas. H. Stratton Inventor,
By Wilhelm Bonner
Attorneys.

No. 694,037. Patented Feb. 25, 1902.
C. H. STRATTON.
SHIFTING SEAT VEHICLE.
(Application filed Nov. 14, 1901.)
(No Model.) 3 Sheets—Sheet 3.
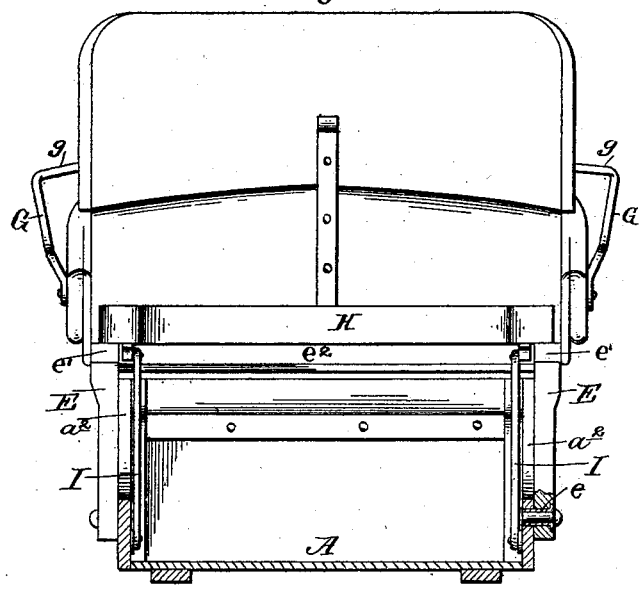
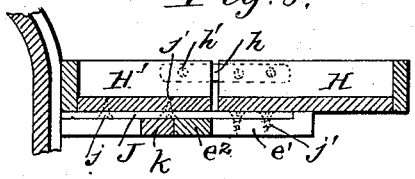
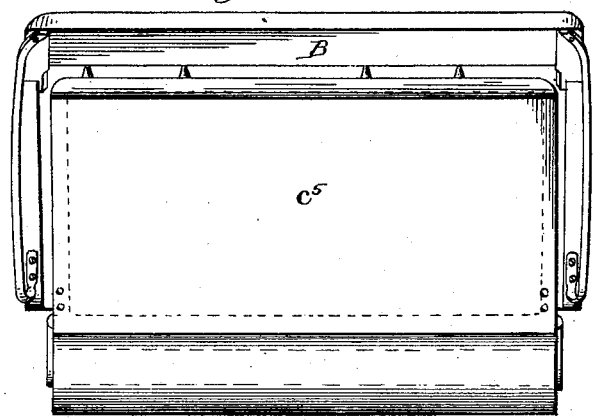
Witnesses,
F. F. Scherzinger
E. A. Volk
Chas. H. Stratton Inventor,
By Wilhelm Bonner
Attorneys.

UNITED STATES PATENT OFFICE.

CHARLES H. STRATTON, OF MUNCIE, INDIANA.

SHIFTING-SEAT VEHICLE.

SPECIFICATION forming part of Letters Patent No. 694,037, dated February 25, 1902.

Application filed November 14, 1901. Serial No. 82,217. (No model.)

*To all whom it may concern:*

Be it known that I, CHARLES H. STRATTON, a citizen of the United States, residing at Muncie, in the county of Delaware and State of Indiana, have invented new and useful Improvements in Shifting-Seat Vehicles, of which the following is a specification.

This invention relates to a convertible single or double seated vehicle of the same general type as that disclosed in Patent No. 600,625, granted to me March 25, 1898. The vehicle described in said patent was provided with a movable front seat and a rear seat adapted to swing down forwardly and having a back which when the seat was swung forwardly extended under the front seat of the vehicle, the lower portion of the back of the rear seat forming a deck or deck-panel for the vehicle.

One of the objects of the present invention is to produce a vehicle of this general character having a narrow body and wide seats.

Another object is to construct the vehicle so that the same will be attractive in appearance, strong, stable, and will not rattle.

A further object is to mount the front seat so that the same can be shifted to a more or less forward position when the vehicle is to be used as a two-seated carriage and can be turned down in front of the front-seat support, so as to afford an unobstructed space between the seat-support and the turned-down seat for permitting the entrance of a person to the vehicle.

Figure 3:
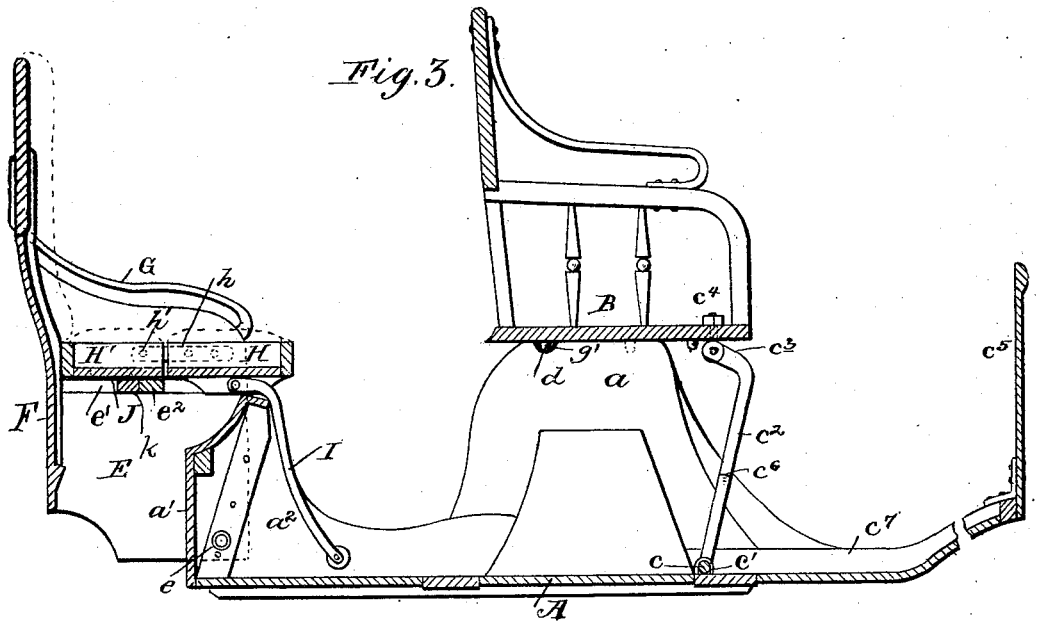
Figure 4:
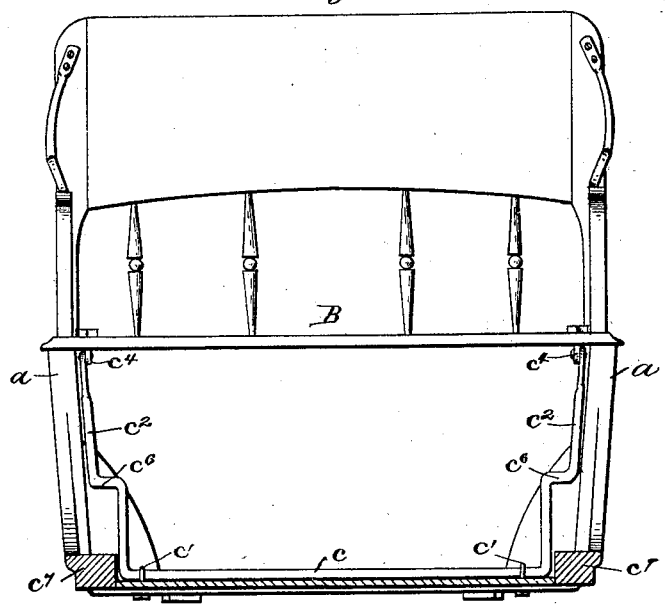

In the accompanying drawings, consisting of three sheets, Figure 1 is a side elevation of a vehicle embodying my invention and showing the rear seat turned down, as when but one seat is used. Fig. 2 is a longitudinal vertical section thereof. Fig. 3 is a longitudinal vertical section showing the rear seat in its upper position, or in position for use. Fig. 4 is a transverse sectional elevation through the body in front of the front seat and looking rearwardly. Fig. 5 is a transverse section through the body between the front and rear seats looking rearwardly. Fig. 6 is a front elevation showing the front seat in its lowered position. Fig. 7 is a fragmentary detail plan view showing the arrangement of the back of the rear seat and associated parts when the seat is turned down. Fig. 8 is a detail section through the rear seat, showing the connection of the cushion-frame with the seat-frame.

Like letters of reference refer to like parts in the several figures.

A represents the body of the vehicle, which is provided at opposite sides substantially midway between the front and rear ends with the side panels $a$, which extend upwardly from the bottom of the body and flare outwardly, at its rear end with a rear wall $a'$, the upper portion of which is inclined forwardly, forming a portion of the top or deck of the body when the vehicle is used as a phaeton or single-seat conveyance, and with rear side panels $a^2$, extending from the rear wall $a'$ to the side panels $a$.

B represents the front seat of the vehicle. This seat, as will be seen from Fig. 4, is wider than the body or floor of the body and extends over and rests upon the upper edges of the side panels $a$. The front seat is connected to the upper end of a swinging frame. This swinging frame is substantially U-shaped and is provided with a horizontal transverse rod or bar $c$, which is pivotally connected to the bottom of the body in any suitable manner—for instance, by means of the U bolts or clips $c'$—and with upwardly-projecting side arms $c^2$, the upper ends of which are bent rearwardly to form supporting-shoulders $c^3$ for the front seat. The rear ends of the rearwardly-projecting portions of the arms are pivotally connected to the seat somewhat back from the front edge thereof in any preferred manner, as by eyebolts $c^4$, secured to and depending from the seat. By means of the swinging frame the front seat can be turned downwardly off of its supports into the position shown by dotted lines in Fig. 2 of the drawings. The seat is sufficiently wide to permit the arms thereof to straddle the dashboard (shown at $c^5$) and not strike or rest upon the same. The seat is supported in this position and prevented from tilting forward on the dashboard by means of the shoulders $c^3$ on the frame-arms $c^2$. The arms are prevented from dropping below the inclined position (indicated in Fig. 2) by means of lateral offset portions $c^6$ in the arms, which contact with the upper faces of the front side sills $c^7$ of the body. The pivotal connection between the frame-arms and the front seat permits the latter to be shifted to a more or less forward position on the supporting-panels a. (See Figs. 1 and 3.) The front seat is provided at its ends with depending projections, preferably rubber buttons d, which are adapted to engage in notches in the upper edges of the panels to hold the seat in the position to which it is adjusted. Any desired number of notches may be provided, so as to hold the seat in any desired position.

E E represent side panels for the rear seat. These side panels are arranged outside of the rear body-panels $a^2$ and are pivoted thereto at or near their forward corners in any preferred manner, preferably by means of hollow bushings e, extending through holes in the seat and body panels, and securing-bolts passing through the bushings, as shown in Fig. 5. The side panels E are provided with longitudinal supporting-bars or frame-pieces $e'$, which are connected by a transverse bar $e^2$. The supporting-bars $e'$ when the panels are in their upright position (indicated in Fig. 3) extend horizontally and afford supports for the ends of the rear seat. The upper edges of the rear-seat panels E are shaped to correspond with the rear edges of the forward side panels a of the body, so that when the rear seat is turned down into the position indicated in Figs. 1 and 2 the upper edges of the seat-panels contact with the rear edges of the body-panels a and form a close joint therewith. The rear edges of the seat-panels are connected by the back F. This back extends from the lower portion of the panels upwardly above the seat, and when the rear seat is turned downwardly it constitutes the deck-panel or top of the body, as indicated in Figs. 1 and 2. In this position of the parts the back of the rear seat extends forwardly beneath the front seat. The back is narrower than the seat and moves downwardly between the upper ends of the side body-panels a. The rear seat is provided with skeleton arms G, which are secured at their forward ends to the upper portions of the seat-panels E and at their rear ends join the back of the rear seat by means of lateral offset or inbent portions g. When the rear seat is turned downwardly, as when one seat only is used, these inbent portions g of the skeleton arms enter transverse notches $g'$ in the rear portion of the upper edges of the body-panels a beneath the bottom of the front seat. The notches $g'$ are preferably provided with rubber buffers or linings, on which the arm portions rest. When the rear seat is turned down, the front seat rests on these arm portions g and holds the rear seat firmly down and prevents it from rattling.

The rear-seat bottom or seat proper is shown to be in the form of a cushion-frame made up of front and rear sections H H'. The front frame-section is hinged to the rear section by means of side hinge-arms h, secured rigidly to the ends of the front frame-section and extending rearwardly at the sides of the rear frame-section, to which they are pivoted somewhat back of the front edge thereof by means of pivots $h'$.

I represents links which are pivoted at their lower ends to the lower portions of the rear side panels of the body and at their upper ends to depending cleats or brackets secured to the under side of the front cushion-frame section H. By this arrangement when the rear seat is swung downwardly on its pivotal connection with the body the front cushion-frame section is caused by the links to swing upwardly on its hinge connection with the rear cushion-frame section, as shown in Fig. 2. The front cushion-frame section is thus held above the lower portion of the rear side panels of the body and between the wide flaring portions of the front-seat panels, so that a rear seat of greater width than the body can be used. When the rear seat is moved to its upright position, (shown in Fig. 3,) the front cushion-frame section H rests upon and is supported by the bars $e'$, secured to the upper part of the seat-panels E. These bars also support the rear section of the cushion-frame.

The cushion sectional frame in the construction of the vehicle is made separately from the body and is secured to the body after the same is built. The means for securing the cushion-frame in place is preferably as shown in Fig. 8, which is as follows:

J represents metal straps or strips secured, as by screws j, to the under side of the rear frame-section at the ends thereof and projecting forwardly under the front frame-section. When the cushion-frame is applied to the seat, the front section thereof is turned upwardly on its hinges h and the front ends of the straps J secured to the bars $e'$, as by screws $j'$. The straps are preferably set into the supporting-bars to bring the upper faces thereof flush with the upper faces of the forward portions of the bars. The rear cushion-frame section is provided with a transverse cleat k, located in rear of the cross-bar $e^2$.

The U-shaped swinging frame for the front seat being pivoted by its horizontal bar to the bottom of the body does not obstruct the space in the body under the seat, and when the seat is thrown down there is a free passage left between the same and the front edges of its supporting-panels through which a person can enter the vehicle and pass rearwardly to the rear seat when desired, as when the rear entrance-space is closed by top curtains or it is desired to avoid contact of the garments with the rear wheel. The U-shaped swinging frame is stronger and more rigid than disconnected side arms, and the arms are caused to move together, so that the seat can be readily shifted by taking hold of either side thereof, and will not wabble or move laterally as would be the case with disconnected side arms.

I claim as my invention—

1. The combination of a vehicle-body provided with supports for a seat, a seat resting on said supports, and a substantially U-shaped frame having a horizontal bar located at the bottom of the vehicle-body and hinged thereto and having upwardly-projecting side arms connected to said seat, substantially as set forth.

2. The combination of a vehicle-body provided with supports for a seat, a seat resting on said supports and disconnected therefrom, and side swinging arms pivoted to the body and having rigid rearwardly-projecting portions at their upper ends pivotally connected to said seat in rear of the front edges thereof, whereby said seat can be swung down on said arms with the rearwardly-projecting end portions bearing flat against the seat to support the same in a lowered position, substantially as set forth.

3. The combination of a vehicle-body having supports for a seat, a seat resting on said supports, and side swinging arms pivoted at their lower ends to the body and connected at their upper ends to said seat, said swinging arms having lateral offset portions adapted to contact with the side sills of the body when the arms are swung downwardly, substantially as set forth.

4. The combination with a body having front-seat supports, of a front seat, and a rear seat pivoted to said body and having a back adapted when said seat is turned down to project forwardly between said front-seat supports, said front seat resting on parts carried by said rear-seat back when the same is in its lowered position to prevent the same from rattling, substantially as set forth.

5. The combination with a body having front-seat supports at the side thereof, of a rear seat pivoted to said body, a back therefor adapted when the seat is turned down to project forwardly between said front-seat supports, skeleton arms connected to said rear seat and having inwardly-extending portions adapted to rest on the upper edges of said front-seat supports, and a front seat resting upon said front-seat supports and said inwardly-extending skeleton arms, substantially as set forth.

6. The combination with a vehicle-body, of a seat having panels located at the sides of said body and pivoted thereto, supports on said panels, and a sectional bottom-frame connected to said seat-panels and resting on said supports, one section of said bottom-frame being hinged to swing off of said supports when said seat is turned downwardly, substantially as set forth.

7. The combination with a vehicle-body, of seat-panels located at the sides of said body and pivoted thereto, seat-supporting bars secured to said panels, a seat-bottom frame composed of a rear section fixedly secured on said supporting-bars, and a front section hinged to said rear section, and links pivoted to said front-seat section and to said body, substantially as set forth.

8. The combination with a vehicle-body, of a seat pivoted thereto, a seat-bottom frame composed of a rear section fixedly secured to said seat, and a front section having hinge-arms pivoted to said rear section in rear of the front edge thereof, and a link or links connected to said front frame-section and to said body, substantially as set forth.

9. The combination with a vehicle-body, of a seat pivoted thereto to swing downwardly on said body, of a sectional seat-bottom frame carried by said seat and of greater width than the width of the body, and means for causing one section of said seat-frame to move upwardly when said seat is swung downwardly, substantially as set forth.

Witness my hand this 8th day of November, 1901.

CHARLES H. STRATTON.

Witnesses:
GEO. H. KOONS,
SHELDON HICKMAN.